United States Patent [19]
Burnham

[11] Patent Number: 5,146,252
[45] Date of Patent: Sep. 8, 1992

[54] POP-OUT VIEWFINDER FOR COMPACT CAMERA WITH FLIP-UP FLASH UNIT

[75] Inventor: William L. Burnham, Leroy, N.Y.

[73] Assignee: Eastman Kodak Company, Rochester, N.Y.

[21] Appl. No.: 726,100

[22] Filed: Jul. 5, 1991

[51] Int. Cl.⁵ .............................................. G03B 15/03
[52] U.S. Cl. .............................. 354/149.11; 354/187; 354/219
[58] Field of Search ................. 354/149.11, 219, 223, 354/187

[56] References Cited

U.S. PATENT DOCUMENTS

| | | | |
|---|---|---|---|
| 3,987,469 | 10/1976 | Winkles et al. | 354/187 |
| 4,032,940 | 6/1977 | Chan | 354/219 |
| 4,387,978 | 6/1983 | Pizzuti | 354/187 |
| 4,557,571 | 12/1985 | Riebl | 354/149.11 |
| 4,609,269 | 9/1986 | Kanata | 354/149.11 |
| 4,983,999 | 1/1991 | Meisezahl et al. | 354/149.1 |
| 4,996,548 | 2/1991 | Schappler et al. | 354/149.11 |

*Primary Examiner*—L. T. Hix
*Assistant Examiner*—David M. Gray
*Attorney, Agent, or Firm*—Roger A. Fields

[57] ABSTRACT

A compact camera having an electronic flash unit which is flipped up for use is adapted to pop out a finder eyelens from inside the camera body to outside the camera body responsive to flipping up the flash unit.

4 Claims, 4 Drawing Sheets

POP-OUT VIEWFINDER FOR COMPACT CAMERA WITH FLIP-UP FLASH UNIT

CROSS-REFERENCE TO RELATED APPLICATIONS

Reference is made to commonly assigned copending applications Ser. No. 479,006 entitled OPTICAL FINDER FOR CAMERA WITH FLIP-UP FLASH UNIT, and filed Feb. 12, 1990, in the name of William L. Burnham, and Ser. No. 670,117 entitled FOLDING DUAL LENS CAMERA, and filed Mar. 15, 1991, in the name of William L. Burnham.

BACKGROUND OF THE INVENTION

1. Field of the Invention

The invention relates generally to the field of photography and particularly to a compact flash unit.

2. Description of the Prior Art

A current trend in camera design is to incorporate an electronic flash unit in the camera housing and yet make such housing relatively small in size in order to increase its ease of storage, portability and handling. Examples of smaller size cameras with built-in electronic flash units are the various disk film cameras, such as previously sold by Eastman Kodak Company and others. As a consequence of making a camera smaller in size, the separation between a built-in flash unit and the taking lens is reduced, thereby possibly creating an undesirable effect commonly known as "red-eye". When using a flash unit and a color print film, red-eye is typified by the pupils in the eyes of a person being photographed coming out red-tinted on a developed color print. Such phenonmenon is attributable to the incidence into the taking lens of the red light reflected from the retinas in the person's eyes illuminated by the flash light.

Red-eye may be substantially avoided by increasing the separation between the flash unit and the taking lens. As a result, light from the flash unit will reach the eyes of a person being photographed at too great an angle to be reflected by his retinas into the taking lens. In U.S. Pat. Nos. 4,231,645, granted Nov. 4, 1980, 4,319,818, granted Mar. 16, 1982, 4,557,571, granted Dec. 10, 1985, D. 284,973 granted Aug. 5, 1986, D. 285,087, granted Aug. 12, 1986, 4,847,647, granted Jul. 11, 1989, 4,983,999, granted Jan. 8, 1991, and 4,996,548, granted Feb. 26, 1991, red-eye appears to be substantially avoided without increasing the size of a compact 35 mm camera to any great degree by providing a built-in electronic flash unit that is pivotable with respect to the camera housing. The flash unit is pivotable between an inactive folded position in which it forms an integrated part of the camera housing in front of the camera lens and/or the camera viewfinder, and an operative erect position in which it is sufficiently removed from the lens to permit picture-taking substantially without the occurrence of red-eye.

More to the point, in U.S. Pat. Nos. D. 284,973, 285,087, 4,983,999, and 4,996,548, a 35 mm camera comprises a camera housing and a flip-up flash unit including a head part having a flash emission window and a pair of front and rear supporting parts for the head part. The supporting parts are pivotally connected to the camera housing to permit swinging movement of the flash unit to a folded storage position in which the head part and the supporting parts cover respective portions of the camera housing and to a non-folded operative position in which the head part and the supporting parts are elevated from the camera housing with the flash emission window substantially facing a subject to be photographed and with the rear supporting parts located behind the front supporting part to brace the front one. At least one of the supporting parts may be releasably detented when the flash unit is in the folded or non-folded position to secure the flash unit in the respective positions.

The Cross-Referenced Applications

Cross-referenced application Ser. No. 479,006 discloses a compact camera with a flip-up flash which has a viewfinder opening for viewing a subject to be photographed when the flash unit is swung to an operative position elevated above the body of the camera. A finder objective lens and a finder eyelens are each swung to individual viewing positions optically aligned with the viewfinder opening in response to movement of the flash unit to its operative position.

SUMMARY OF THE INVENTION

A photographic camera comprising a camera body with an integral viewfinder tunnel, and an electronic flash unit connected to the camera body for movement to an operative position in which the flash unit is extended from the camera body, is characterized in that:

a lens carrier for a finder lens is supported for movement along the viewfinder tunnel between a storage position in which the finder lens is retracted inside the viewfinder tunnel and an operative position in which the finder lens is extended outside the viewfinder tunnel; and motion-transmitting means associates the flash unit and the lens carrier for moving the lens carrier from its storage position to its operative position in response to movement of the flash unit to its operative position.

Preferably, the flash unit is connected to the camera body via pivot means to permit the flash unit to be swung to its operative position, and the motion-transmitting means includes cam means located on the flash means eccentrically with respect to the pivot means for imparting motion to the lens carrier to move the lens carrier to its operative position when the flash unit is swung to its operative position.

DETAILED DESCRIPTION OF THE PREFERRED EMBODIMENT

The invention is described as being embodied in a compact 35 mm camera with a built-in electronic flash unit. Because such photographic cameras have become well known, this description is directed in particular to camera elements forming part of or cooperating directly with the preferred embodiment. It is to be understood, however, that camera elements not specifically shown or described may take various forms known to persons of ordinary skill in the art.

Figure 1:
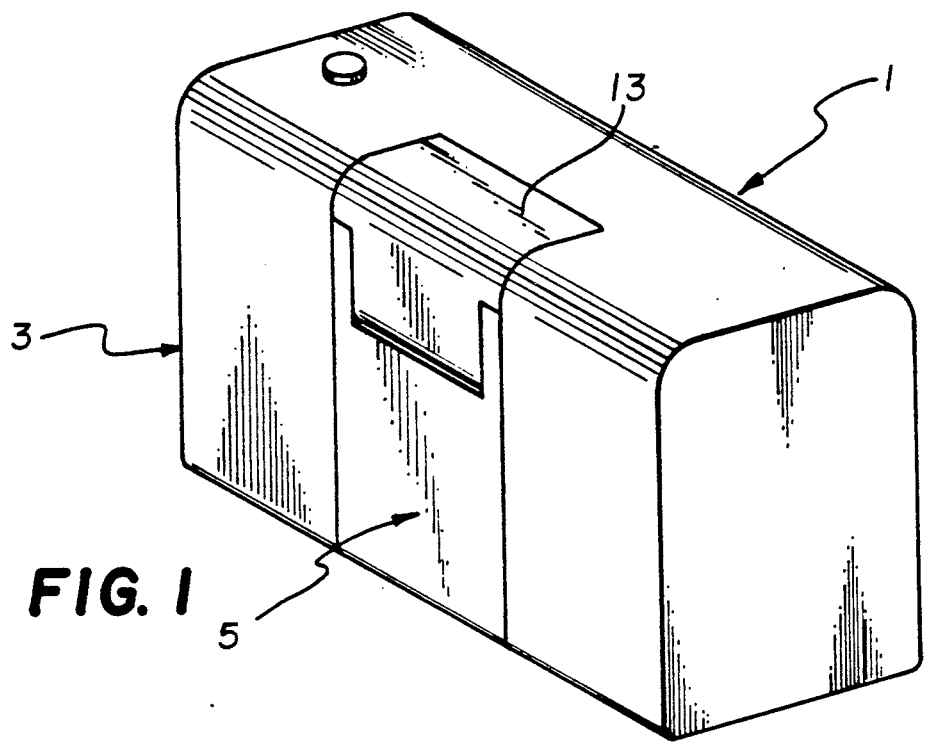
FIG. 1 is a front perspective view of a compact camera with a pop-out viewfinder and a flip-up flash unit according to a preferred embodiment of the invention, showing the flash unit in folded storage position.
Figure 2:
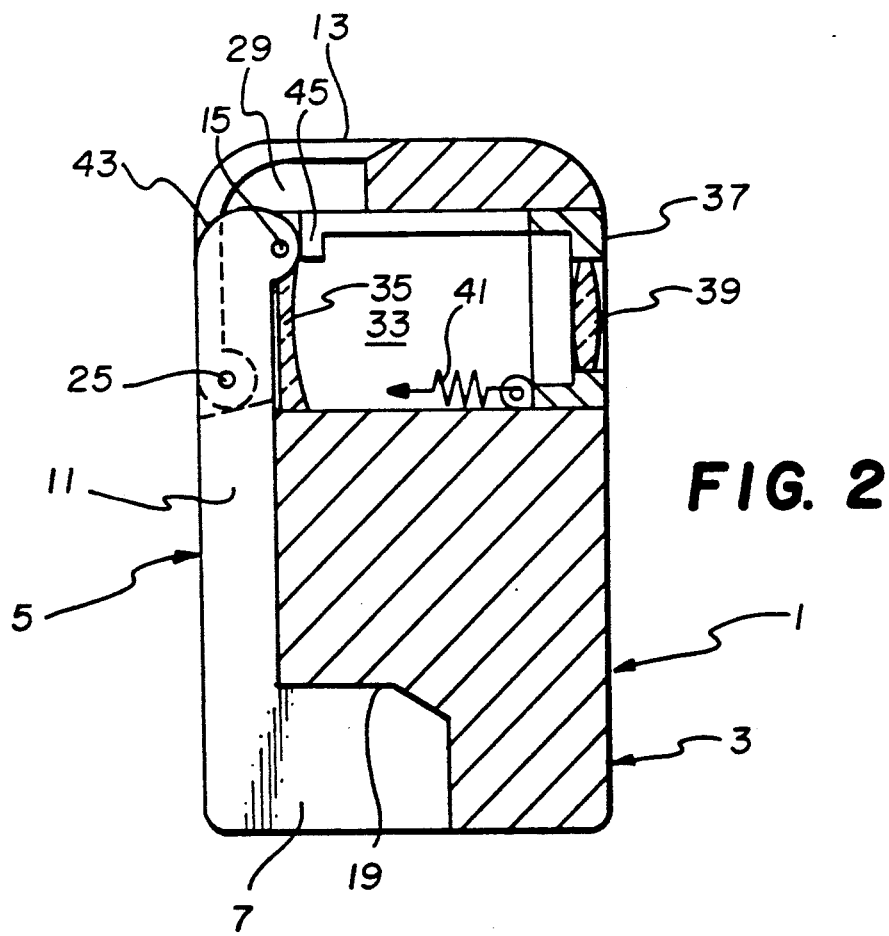
FIG. 2 is a side elevation view of the compact camera, partly in section, showing the flash unit in its folded storage position and the viewfinder in a retracted storage position.

Referring now to the drawings, FIGS. 1 and 2 show a compact 35 mm camera 1 comprising a contoured housing 3 and a flip-up electronic flash unit 5. The flash unit 5 includes a head part 7 having a flash emission window 9 and a pair of front and rear supporting parts 11 and 13 for the head part. The front supporting part 11 is integrally formed with the head part 7, and is pivotally connected to the camera housing 3 by means of two axial pins 15 extending through respective axial openings (not shown) in the front supporting part and having protruding ends suspended by the camera housing. The pivotal connection of the front supporting part 11 to the camera housing 3 permits the flash unit 5 to be manually swung between a folded storage position, shown in FIGS. 1 and 2, in which the head part 7 fits within a lower recess 19 in the camera housing and the front supporting part fits within a front recess 21 in the camera housing to cover a lens opening 23, and a non-folded operative position, shown in FIGS. 3, 4 and 5, in which the head part and the front supporting part are elevated from the camera housing with the flash emission window 9 substantially facing a subject to be photographed. The rear supporting part 13 is pivotally connected to the front supporting part 11 by means of a single axial pin 25 extending through an axial opening (not shown) in the rear supporting part and having protruding opposite ends suspended by the front supporting part. The pivotal connection of the rear supporting part 13 to the front supporting part 11 permits the rear supporting part to be located within a top recess 29 in the camera housing when the flash unit 5 is in its storage position, shown in FIGS. 1 and 2, and to be elevated above the camera housing when the flash unit 5 is in its operative position, shown in FIGS. 3, 4 and 5. When the flash unit 5 is in its operative position, a forward edge 31 of the rear supporting part 13 rests atop the camera housing 3 to brace the flash unit in the operative position. A relatively light torsion spring (not shown) urges the rear supporting part 13 in a clockwise direction in FIGS. 2 and 5 about the axial pin 25.

Figure 4:
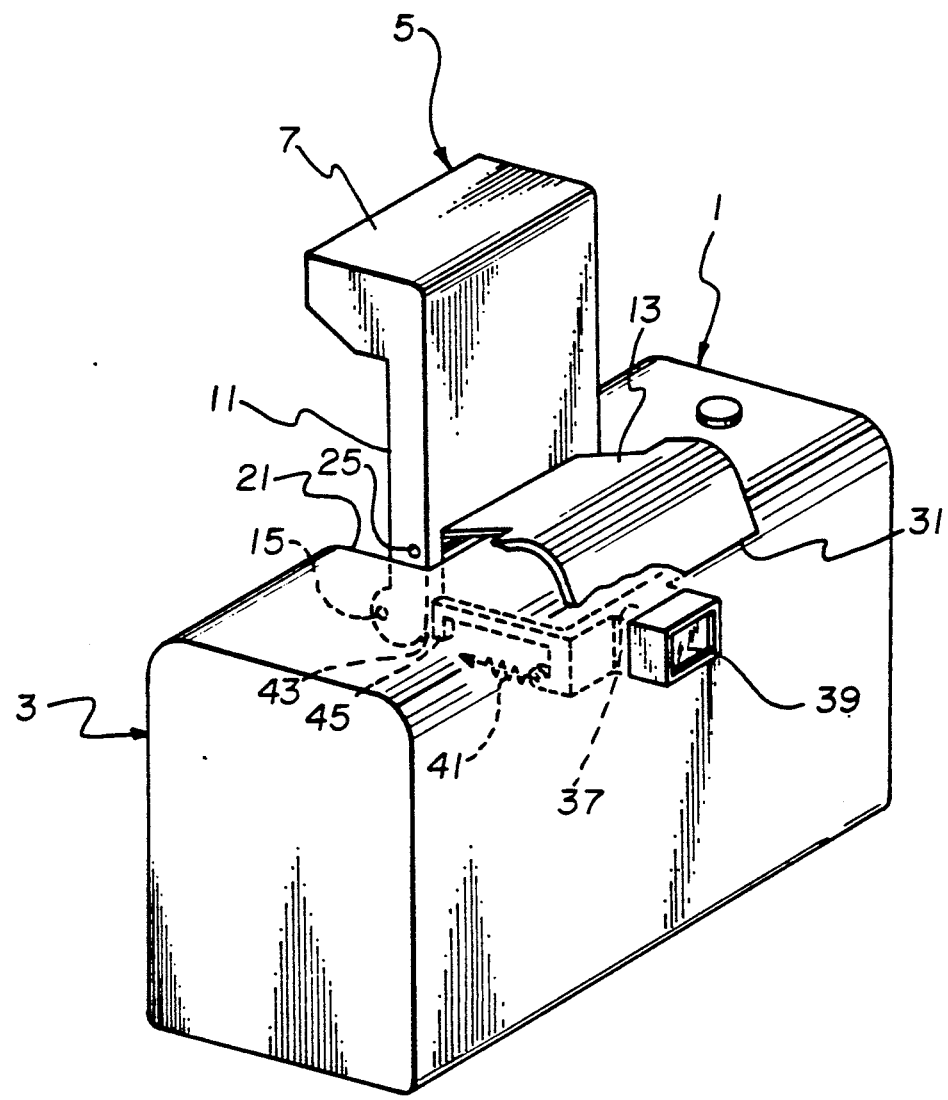
FIG. 4 is a rear perspective view of the compact camera, showing the flash unit in its non-folded operative position and the viewfinder in an extended operative position.
Figure 5:
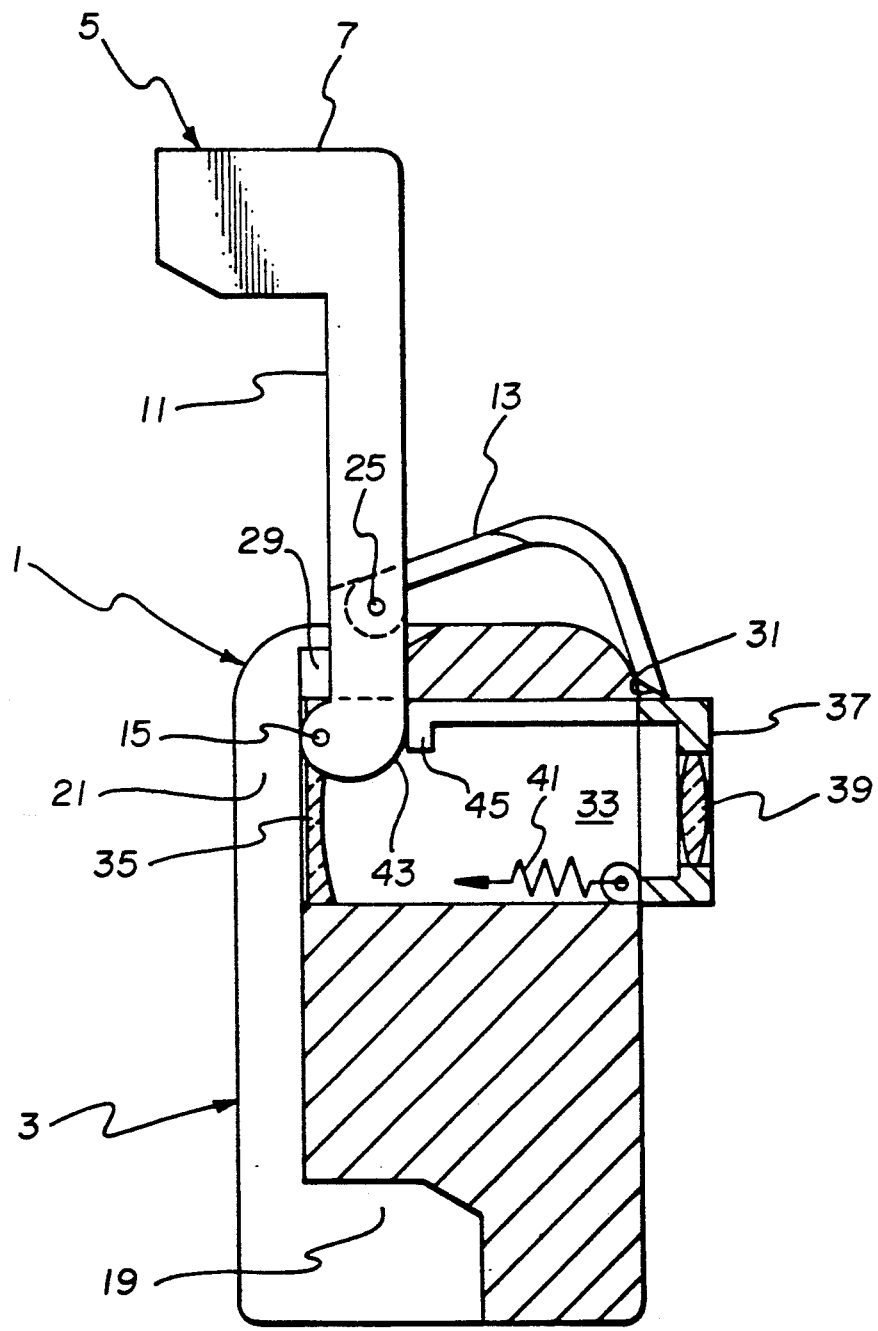
FIG. 5 is a side elevation of the compact camera, partly in section, showing the flash unit in its non-folded operative position and the viewfinder in its extended operative position.

According to the invention in its preferred embodiment, an open-ended viewfinder tunnel 33 is formed in the camera housing 3 as shown in FIGS. 2 and 5. A plano-concave (negative) finder objective lens 35 is fixed to the camera body 3 directly in front of the viewfinder tunnel 33. A lens carrier 37 for a biconvex (positive) finder eyelens 39 is supported for translation along the viewfinder tunnel 33 between a concealed storage postion, shown in FIG. 2, in which the finder eyelens is retracted inside the viewfinder tunnel, and an exposed operative position, shown in FIGS. 4 and 5, in which the finder eyelens is extended rearward outside the viewfinder tunnel. A helical tension spring 41 urges the lens carrier 37 to its storage position.

Figure 3:
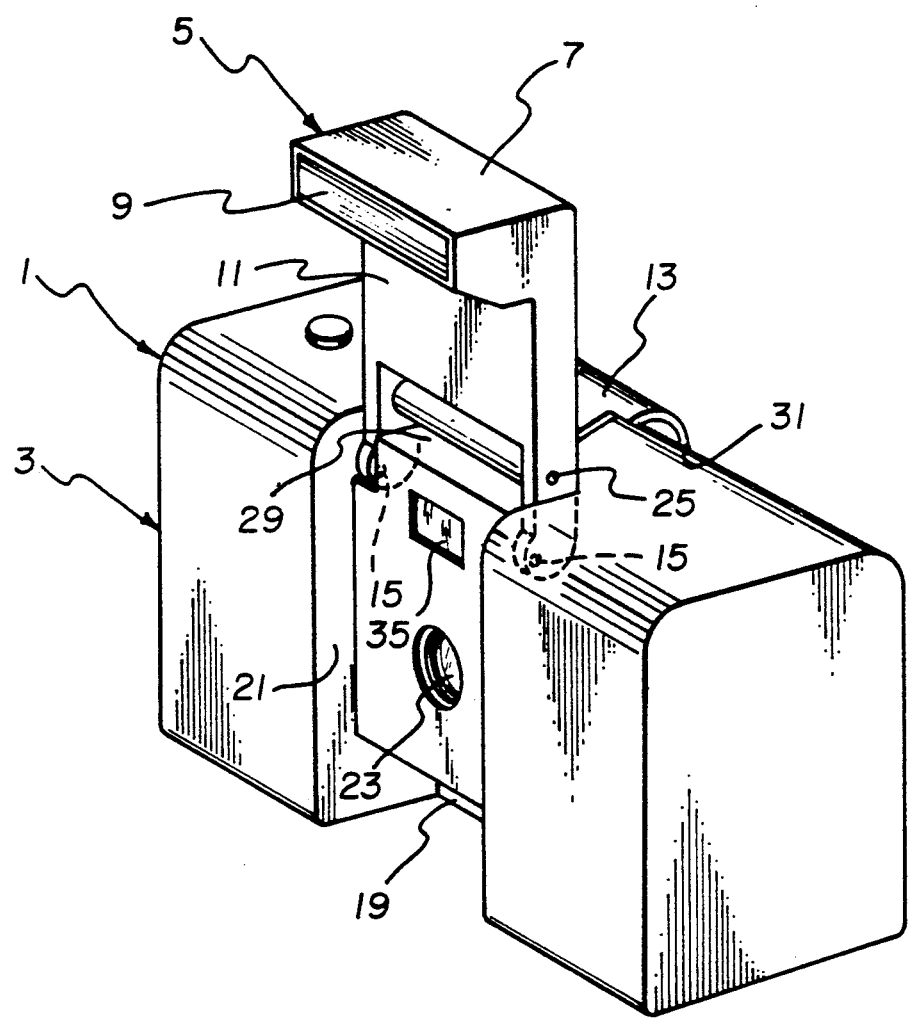
FIG. 3 is a front perspective view of the compact camera, showing the flash unit in a non-folded operative position.

When the flash unit 5 is manually swung from its storage position, shown in FIGS. 1 and 2, to its operative position, shown in FIGS. 3-5, two cam portions 43 of the front supporting part 11, located eccentrically with respect to the axial pins 15, push against respective follower portions 45 of the lens carrier 37 to translate the lens carrier 37 from its storage position, shown in FIG. 2, to its operative position, shown in FIGS. 4 and 5. Movement of the lens carrier 37 to its operative position locates the finder eyelens 39 in correct relation with the finder objective lens 35 to permit a subject to be photographed to be viewed through the two lenses. When the flash unit 5 is manually swung from its operative position to its storage position, the cam portions 43 are withdrawn from the follower portions 45 to allow the tension spring 41 to return the lens carrier 37 to its storage position.

The invention has been described with reference to a preferred embodiment. However, it will be understood that various modifications can be effected within the ordinary skill in the art without departing from the scope of the invention. For example, the flash unit 5 might be a type that pops up rather than flips up. Also, in place of the cam portions 43 of the front supporting part 11 of the flash unit 5, the follower portions 45 of the lens carrier 37 could be pivotally connected to the front supporting part in a manner that would cause the lens carrier to translate between its storage and operative positions as the flash unit is swung between its storage and operative positions.

I claim:

1. A photographic camera comprising a camera body with an integral viewfinder tunnel through which a subject to be photographed is viewed, and an electronic flash unit connected to said camera body for movement to an operative position in which said flash unit is extended from the camera body, is characterized in that:
    a lens carrier for a finder lens is supported for translation along said viewfinder tunnel between a storage position in which said finder lens is retracted inside the viewfinder tunnel and an operative position in which the finder lens is extended outside the viewfinder tunnel; and
    motion-transmitting means associates said flash unit and said lens carrier for moving the lens carrier from its storage position to its operative position in response to movement of the flash unit to its operative position.

2. A photographic camera as recited in claim 1, wherein said flash unit is connected to said camera body via pivot means to permit the flash unit to be swung to its operative position, and said motion-transmitting means includes cam means located on said flash means eccentrically with respect to said pivot means for imparting motion to said lens carrier to move the lens carrier to its operative position when the flash unit is swung to its operative position.

3. A photographic camera as recited in claim 1, wherein said finder lens is an eyelens, and said lens carrier is dimensioned to shift said eyelens from inside said viewfinder tunnel to rearward of said camera body as the lens carrier is moved from its storage position to its operative position.

4. A photographic camera comprising a camera body with an integral fixed viewfinder tunnel through which a subject to be photographed is viewed, and a flip-up electronic flash unit connected to said camera body for movement between a storage position in which said flash unit is folded against the camera body and an operative position in which the flash unit is elevated above the camera body, is characterized in that:

a lens carrier for a finder lens is supported for translation along said viewfinder tunnel between a storage position in which said finder lens is retracted inside the viewfinder tunnel and an operative position in which the finder lens is extended outside the viewfinder tunnel;

motion-transmitting means associates said flash unit and said lens carrier for translating the lens carrier from its storage to its operative position in response to movement of the flash unit from its storage position to its operative position; and biasing means urges said lens carrier to translate from its operative position to its storage position in response to movement of said flash unit from its operative position to its storage position.

* * * * *